(12) United States Patent
Tajima et al.

(10) Patent No.: US 6,441,721 B1
(45) Date of Patent: Aug. 27, 2002

(54) DATA TRANSMISSION APPARATUS AND DATA RECEPTION APPARATUS

(75) Inventors: Shigeru Tajima; Chisato Numaoka, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/714,022

(22) Filed: Nov. 16, 2000

(30) Foreign Application Priority Data

Nov. 17, 1999 (JP) .......................................... 11-326669

(51) Int. Cl.⁷ ................................................ G08B 1/00
(52) U.S. Cl. .............................. 340/286.01; 340/815.45
(58) Field of Search ........................ 340/286.01, 573.1, 340/815.45, 815.65, 384.7, 691.6, 692, 531

(56) References Cited

U.S. PATENT DOCUMENTS

| | | | | |
|---|---|---|---|---|
| 3,740,644 A | * | 6/1973 | Schag et al. .................... 324/66 |
| 4,591,854 A | * | 5/1986 | Robinson ..................... 340/5.65 |
| 5,046,187 A | | 9/1991 | Takahashi .................... 455/557 |
| 5,184,110 A | * | 2/1993 | Horng ......................... 340/571 |
| 5,204,672 A | | 4/1993 | Brooks .................. 340/825.71 |
| 5,796,827 A | * | 8/1998 | Coppersmith et al. ...... 713/182 |
| 5,811,897 A | | 9/1998 | Spaude et al. .............. 307/149 |
| 5,914,701 A | * | 6/1999 | Gersheneld et al. ........ 345/156 |
| 6,211,799 B1 | * | 4/2001 | Post et al. .............. 345/156 X |
| 2001/0002924 A1 | * | 6/2001 | Tajima ........................ 375/271 |

FOREIGN PATENT DOCUMENTS

| | | |
|---|---|---|
| GB | 2 129 176 | 5/1984 |
| GB | 2 306 725 | 5/1997 |
| WO | 96 36134 | 11/1996 |

* cited by examiner

Primary Examiner—Thomas Mullen
(74) Attorney, Agent, or Firm—Frommer Lawrence & Haug LLP; William S. Frommer; Gordon Kessler

(57) ABSTRACT

A user 100 wears a bracelet-type data reception apparatus 200. When the user touches a contact point 402 on an information plate 300, the user receives data via the human body from a data transmission apparatus 200 associated with the information plate 300. The bracelet-type data reception apparatus 200 is provided with a full-color LED 209. Indications on this full-color LED 209 are used for notifying initiation of data reception, data reception in process, completion of data reception, and the like. A similar full-color LED 402 is installed on the information plate for notifying initiation of data transmission, data transmission in process, completion of data transmission, and the like.

11 Claims, 9 Drawing Sheets

DATA TRANSMISSION APPARATUS AND DATA RECEPTION APPARATUS

BACKGROUND OF THE INVENTION

1. Technical Field

The present invention relates to a data transmission apparatus and a data reception apparatus through the intermediation of a human body.

1. Prior Art

Conventionally, it is proposed to provide an apparatus for communication by means of contact with a human body as disclosed in Japanese Patent Application Laid-Open Publication No. 7-170215. Specifically, voice or video signals are transmitted in the band range of 2 MHz through several tens of megahertz. Such an apparatus can be used for personal authentication as disclosed in U.S. Pat. No. 5,796,827. Using such an apparatus, it is possible to open or close ticket gate for going through it by touching the ticket gate. When the transmission of voice or video signals is applied to the above-mentioned ticket gate control as disclosed in Japanese Patent Application Laid-Open Publication No. 7-170215, it is possible to easily control user situations such as successful authentication and opening of the gate. In an example of opening a door by contact, it takes time to confirm that the user's purpose is accomplished by contact depending on, say, a response speed for opening the door. This adversely gives uncertainty to the user. In such a case, it is desirable to promptly give the user an audio-visual indication. Unlike opening or close a door, there is a case where a user's action is neither visual nor audible. For example, the above-mentioned confirmation means is important when the user downloads music data by touching a music distribution terminal. In this case, it is desirable to provide means for confirming completion of the download visually or audibly.

BRIEF SUMMARY OF THE INVENTION

The present invention has been made in consideration of the foregoing. It is therefore an object of the present invention to provide a technique for giving a user an indication of data transmission or reception situations through the use of the five senses including senses of sight, hearing, touch, and the like.

To implement the above-mentioned object, the present invention employs a configuration indicated in the appended claims. The supplementary explanation is provided below.

To implement the above-mentioned object, the present invention provides a data transmission apparatus appropriate to a system for transmitting and receiving signals by using a human body as a transmission path. This apparatus comprises a contact point for conducting data transmission by contact with a human body, means for data transmission in response to initiation of a contact between the contact point and the human body, and means for notifying completion of the data transmission.

According to this configuration, a user touches the contact point of the data transmission apparatus to initiate data transmission. Data is transmitted to a data reception apparatus. The data reception apparatus has a corresponding contact point. This contact point is used for receiving a signal transmitted via the human body. Basically, the data reception apparatus's contact point preferably always touches the user's skin and the like. Before touching the data transmission apparatus's contact point, the user may touch the data reception apparatus's contact point to establish a reception path.

The data transmission apparatus initiates data transmission in response to the contact, providing time-saving, reliable, and fast data transmission. On completion of the data transmission, a termination indication is notified, eliminating the need for touching the contact point too long.

The above-mentioned configuration may be provided with means for notifying unsuccessful data transmission.

The notification means can be visual means such as a light emitting diode and the like, audible means such as a voice, music, and alarm, and tactile means such as an electric shock, a contact, and the like. The notification means can also use the sense of smell. Further, the notification means may be a vibrating chair or footboard.

An equivalent configuration can be used for the data reception apparatus. Further, an equivalent configuration can be used for a data transmission/reception apparatus which provides data transmission and reception capabilities.

Data is transmitted and received between a combination of the data transmission apparatus and the data reception apparatus immovably installed on a public institution, a building, a public transportation means, and the like and a combination of the data transmission apparatus and the data reception apparatus which a user carries. Alternatively, data is transmitted and received between the data transmission apparatus and the data reception apparatus individually owned by each of users. There may be the case where a stationary data transmission apparatus and a stationary data reception apparatus are installed proximately and a user can touch both the apparatuses at a time. In this case, data can be exchanged between the stationary data transmission apparatus and the stationary data reception apparatus. Either or both of the data transmission apparatus and the data reception apparatus may be installed immovably. The user may carry either or both of the data transmission apparatus and the data reception apparatus.

To implement the above-mentioned object, the present invention provides a data transmission apparatus appropriate to a system for transmitting and receiving signals by using a human body as a transmission path. This apparatus may be provided with a contact point for conducting data transmission by contact with a human body and means for notifying states of the data transmission which uses the contact point and the human body.

Data transmission states include initiation of the data transmission, continuation thereof, successful termination thereof, and unsuccessful termination thereof. Various negotiations may be performed between the transmitting and receiving sides before initiating the data transmission. Various negotiations may be performed when data of the same content or a set of data is transmitted repeatedly. When data is transmitted repeatedly, an initiation of the data transmission can be considered to follow just after a session of the previous transmission.

Also in this case, an equivalent configuration can be used for the data reception apparatus. Further, an equivalent configuration can be used for a data transmission/reception apparatus which provides data transmission and reception capabilities.

As mentioned above, the present invention provides notifications of successful data transmission and other information about the transmission by means of, say, colors, sounds, messages, and vibrations which can be naturally recognized by the five senses of human being. Unlike the case where no means for confirmation is available after a user touches the contact point, the present invention can provide the user with a sense of security and a feeling of fulfillment that he or she certainly has completed the operation.

DETAILED DESCRIPTION OF THE INVENTION

Embodiments of the present invention will be described in further detail with reference to the accompanying drawings.

[First Embodiment]

The following describes the first embodiment of the present invention. This embodiment provides a bracelet-type data reception apparatus worn by a user. When the user touches a contact point on a specified information plate, the user receives data from a data transmission apparatus associated with the information plate. The bracelet-type data reception apparatus is provided with a full-color LED. The full-color LED's indications are used to notify initiation of data reception, the data reception in progress, completion of the data reception, and the like. A similar full-color LED is provided on the information plate for notifying initiation of data transmission, the data transmission in progress, completion of the data transmission, and the like.

Figure 1:
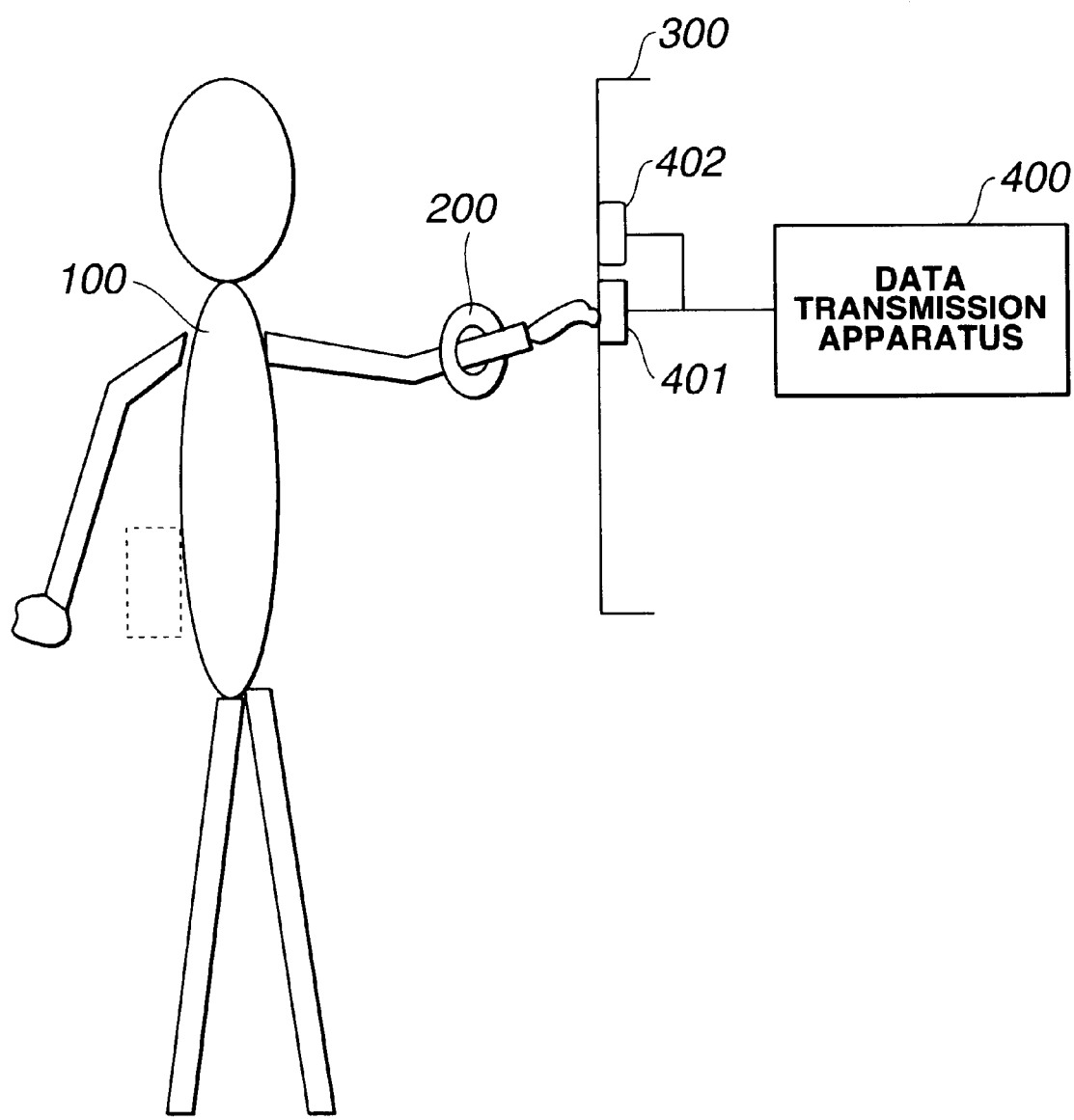
FIG. 1 is a schematic illustration showing a first embodiment of the present invention in its entirety.

FIG. 1 is a schematic illustration showing a first embodiment of the present invention in its entirety. In this figure, a user 100 wears a bracelet-type data reception apparatus 200. The data reception apparatus 200 is so designed that a contact point (electrode) 201 (FIG. 3) thereof touches a human body. An information plate 300 is installed at a height suitable for the user 100 to touch it. The information plate 300 is stationed, say, in a train, a bus, and a public institution. The information plate 300 may be used for advertisement and may be provided as display devices such as a liquid crystal display, a CRT, and a plasma display. A data transmission apparatus 400 is provided in association with the information plate 300. On the information plate 300, there are provided a contact point (electrode) 401 and a full-color LED 402.

Figure 2:
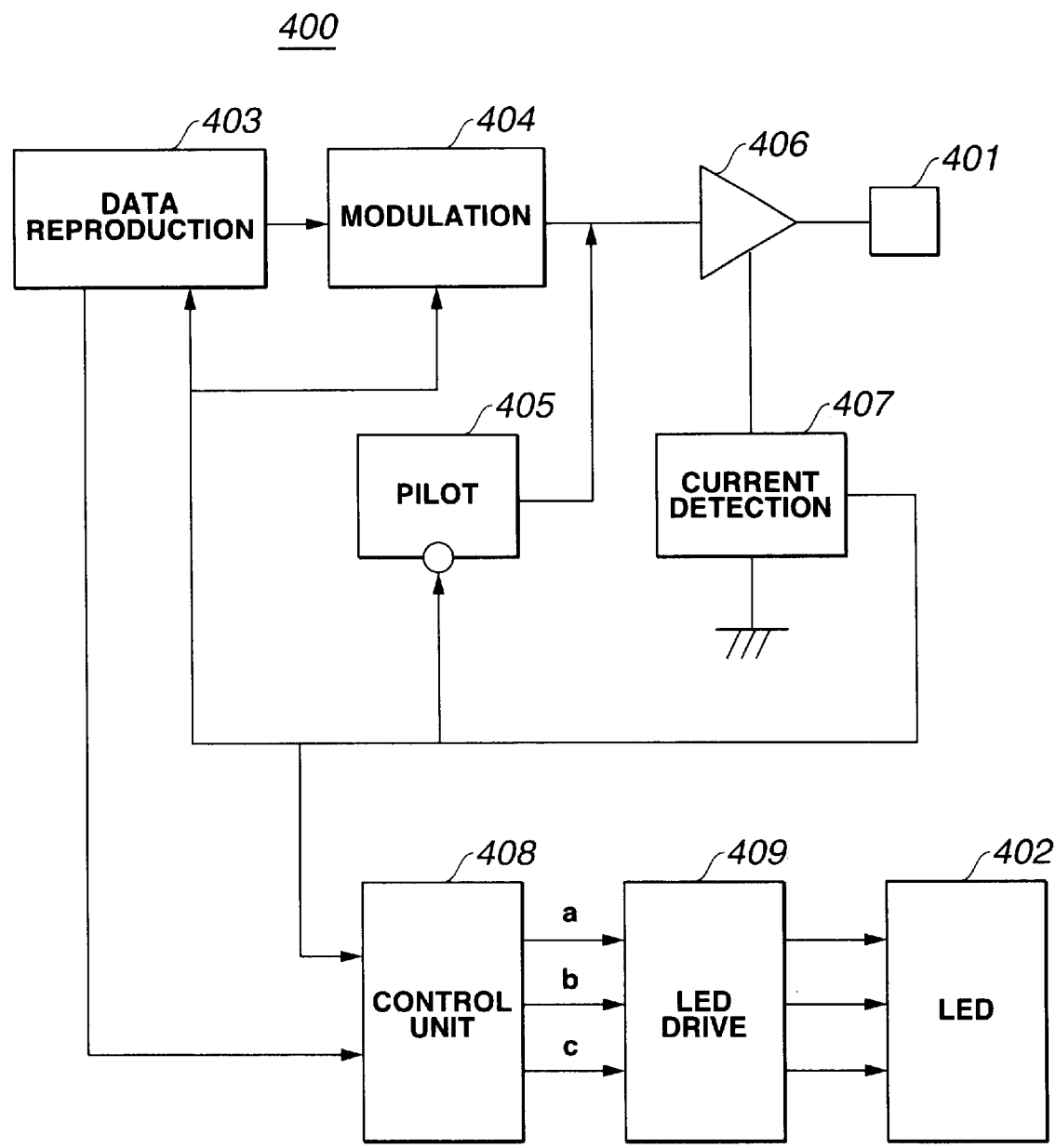
FIG. 2 is a block diagram showing a configuration example of a data transmission apparatus according to the first embodiment.

FIG. 2 shows a configuration of the data transmission apparatus 400. In this figure, the data transmission apparatus 400 comprises a conductive contact point 401, a full-color LED 402, a data reproduction unit 403, a modulation unit 404, a pilot signal generation unit 405, a driver 406, a current detection unit 407, a control unit 408, and an LED drive unit 409. The data reproduction unit 403 generates specified data such as an audio signal, a video signal, text data, an HTML content, and attribute data such as information plate's ID data, and the like. The data reproduction unit 403 may generate data for various negotiations such as authentication data. The modulation unit 404 modulates data output from the data reproduction unit 403 into a signal in an available signal band which can be used with a human body as a transmission path. The available signal band ranges, say, from 2 MHz to 30 MHz. The above-mentioned Japanese Patent Application Laid-Open Publication No. 7-170215 describes in detail how a signal in this band is transmitted via a human body. Available modulation methods include the FM modulation such as FSK, the AM modulation such as ASK, the code modulation, and the like. A modulation signal from the modulation unit 404 is amplified in the driver 406 and is supplied to the contact point 401. The current detection unit 407 is connected to the driver 406 and detects a current flowing from the driver 406 to the contact point 401 using, say, the current mirror technique. The pilot signal generation unit 405 supplies the driver 406 with a specified pilot signal when the data reproduction unit 403 transmits no data, namely when no modulation signal is supplied to the driver 406. The control unit 408 generates a specified combined logical output based on a detection result from the current detection unit 407 and the end of data output from the data reproduction unit 403. The LED drive unit 409 drives R, G, and B elements of the full-color LED 402 based on the combined logical output from the control unit 408. The full-color LED 402 is exemplified in, say, Japanese Utility Model Registration No. 2917814.

When the user 100 (FIG. 1) does not touch the contact point 401, the driver 406 does not supply a drive current to the contact point 401. Accordingly, the current detection unit 407 outputs "0". The "0" signal is reversed and is supplied to the pilot signal generation unit 405 to enable it. The "0" signal from the current detection unit 407 is supplied as a disable signal to the data reproduction unit 403 and the modulation unit 404. Consequently, only a pilot signal is supplied to the driver 406.

Figure 3:
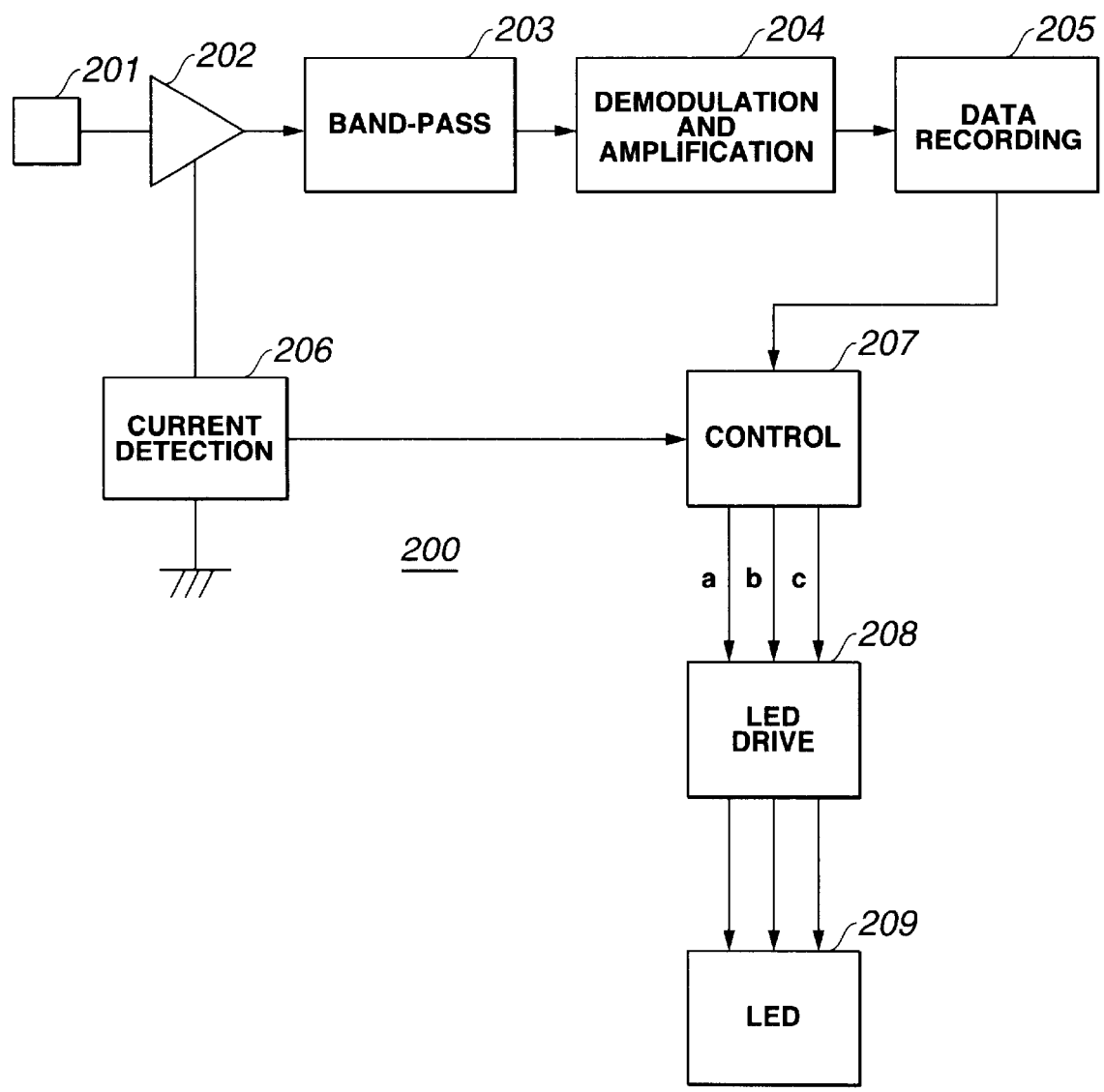
FIG. 3 is a block diagram showing a configuration example of a data reception apparatus according to the first embodiment.

When the user 100 touches the contact point 401, the pilot signal is supplied to the contact point 401 and the human body via the driver 406. Consequently, the current detection unit 407 detects the current and reverses its output from "0" to "1". Consequently, the data reproduction unit 403 and the modulation unit 404 are enabled to initiate the data transmission. By contrast, the pilot signal generation unit 405 is disabled to stop generating a pilot signal. Consequently, the modulation signal is transmitted to the user via the contact point 401 and the human body and is received by the data reception apparatus 200 (FIGS. 1 and 3). Note that a pilot signal band is cut in the data reception apparatus 200 and gives no effect on data transmission and reception.

When the current detection unit 407 detects a current to initiate data transmission, the control unit 408 is supplied with a "1" signal at the same time. A first LED element drive signal "a" is supplied from the control unit 408 to the LED drive unit 409 to turn on, say, a blue LED. This LED continues to light while data is transmitted. When the data reproduction unit 403 supplies an end-of-data output to the control unit 408, the control unit 408 outputs a second LED element drive signal "b". For example, a green LED turns on. This means successful data transmission. The green LED turns off after a specified time period by means of a timer. When the current detection signal goes "0" from "1" with no end-of-data output supplied to the control unit 408, the control unit 408 detects this signal change and supplies a third LED element drive signal "c" to the LED drive unit 409. This turns on, say, a red LED. This means unsuccessful data transmission. Also in this case, the LED turns off after a specified time period.

With the data transmission apparatus 400 having the above-mentioned configuration, data transmission starts when the user touches the contact point 401 on the information plate 300. The user is notified of data transmission states by means of the full-color LED 402's indications.

FIG. 3 shows a configuration example of the data reception apparatus 200 which the user 100 wears. In this figure, the data reception apparatus 200 comprises a conductive contact point 201, a preamplifier 202, a band-pass filter 203, a demodulator and amplifier 204, a data recording unit 205, a current detection unit 206, a control unit 207, an LED drive unit 208, and a full-color LED 209. The contact point 201 does not necessarily touch the human body's skin, but is placed near the skin so that signals are reliably transmitted via the human body. It is also preferable to use conductive clothes and accessories as conductive supplementary members. The band-pass filter 203 identifies signals in a modulation band. The demodulator and amplifier 204 demodulates a modulation signal passing through the band-pass filter 203, amplifies that signal, and stores it in the data recording unit 205. The data recording unit 205 may magnetically record signals or use semiconductor memory. The current detection unit 206 detects a signal in the contact point 201, namely the preamplifier 202. The control unit 207 generates a combined logical output based on a current detected in the current detection unit 206 and the end of data detected in the data recording unit 205. This combined logical output controls the LED drive unit 208.

When no modulation signal is received via the contact point 201, the current detection unit 206 outputs "0". As a result, the control unit 207 is supplied with a current detection signal of "0". None of the LED element drive signals "a", "b", and "c" is output. The full-color LED 209 remains off.

When a modulation signal is supplied via the contact point 201 thereafter, the band-pass filter 203 and the demodulator and amplifier 204 demodulate the modulation signal and supply it to the data recording unit 205. At the same time, the current detection unit 206 generates a current detection signal of "1". Based on this current detection signal of "1", the control unit 207 generates a first LED element drive signal "a". The LED drive unit 208 turns on a first LED element, say, a blue LED. This LED remains on while a modulation signal is received to set the current detection output to "1".

When all the data is transmitted completely and the data recording unit 205 detects the end of data, this is supplied to the control unit 207. Consequently, the control unit 207 generates a second LED element drive signal "b". The LED drive unit 208 then turns on a second LED element, say, a green LED element. This means successful termination of the data transmission. This LED turns off after a specified time period by means of a specified timer. There may be the case where the current detection unit 206's output goes "0" from "1" before the data recording unit 205 notifies detection of the end of data. In this case, the control unit 207 generates a third LED element drive signal "c". The LED drive unit 208 turns on a third LED element, say, a red LED element. This means unsuccessful data transmission. Note that this LED indication also turns off after a specified time period by means of a specified timer.

The data reception apparatus 200 having the above-mentioned configuration notifies a user of data reception states by means of LED indications.

As indicated with a broken line in FIG. 1, the data reception apparatus may be a portable box-type storage or information terminal.

Figure 4:
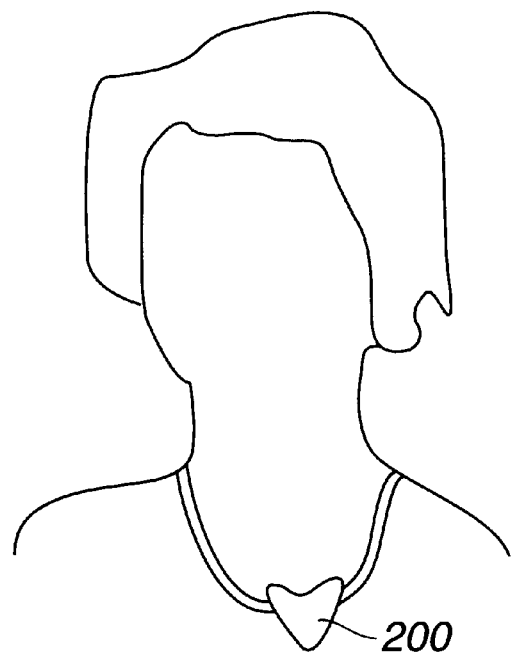
FIG. 4 is an explanatory drawing for a modification of the first embodiment.
Figure 5:
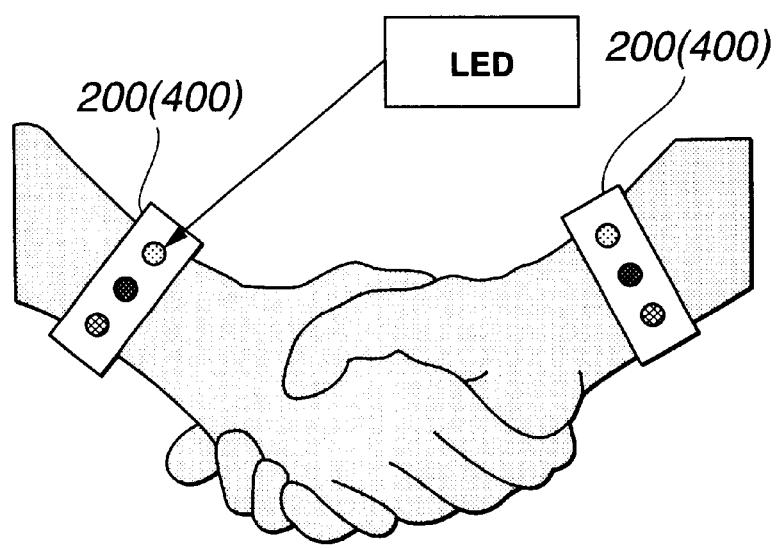
FIG. 5 is an explanatory drawing for another modification of the first embodiment.

As an example in FIG. 1, the data reception apparatus 200 is configured like a bracelet. As shown in FIG. 4, the data reception apparatus 200 may be also configured like a necklace. As shown in FIG. 5, instead of a full-color LED, a plurality of single-color LEDs is used for indicating states of transmitting or receiving data. An example in FIG. 5 shows that data is exchanged between users by means of the bracelet-type data reception apparatus 200 and the bracelet-type transmission data 400. Apparently, a bracelet-type body may house the data transmission apparatus and the data reception apparatus together.

[Second Embodiment]

The following describes a second embodiment of the present invention. This embodiment provides the data transmission apparatus or the data reception apparatus with a sound source. When the transmission is successful, a first melody is played. When the transmission is unsuccessful, a second melody is played. A melody is a combination of sounds with at least one frequency. Two melodies may be available in any form as long as they can be distinguished from each other. For example, a 440 MHz sound may be generated for successful transmission. An 880 MHz sound may be generated for unsuccessful transmission. Again, for example, "Wedding March" may be played at transmission completion. A Chopin's nocturne may be played at transmission termination. These music titles may be downloaded from a remote server or selected from a memory card to user's taste.

Figure 6:
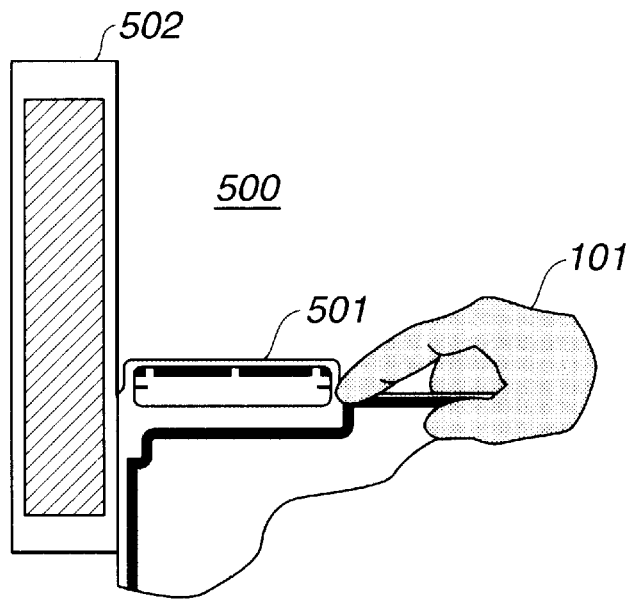
FIG. 6 is an explanatory drawing for a second embodiment of the present invention.

FIG. 6 shows a configuration of a data transmission apparatus 500 according to the second embodiment of the present invention. As shown in FIG. 6, the data transmission apparatus 500 comprises a contact point 501, a speaker 502, and the like. Except these components, the data transmission apparatus 500 basically has the same configuration as for the first embodiment. According to this configuration, when a user's hand 101 touches a contact point 501 of the data transmission apparatus 500, data is supplied to a data reception apparatus (not shown) at the user side in the same manner as the first embodiment. Like the first embodiment, the apparatus detects successful or unsuccessful data transmission and reproduces a corresponding melody.

In this embodiment, the data transmission apparatus 500 reproduces melodies according to the successful or unsuccessful data transmission. Various melodies may be reproduced according to data transmission situations such as initiation of the data transmission and the like. The data reception apparatus may reproduce melodies according to data reception states or may turn on indicators.

[Third Embodiment]

The following describes a third embodiment of the present invention. In this embodiment, when data reception is complete, a data reception apparatus's display shows a message indicating successful completion of the data reception. When the reception is unsuccessful, the display shows a message indicating unsuccessful completion of the data reception.

Figure 7:
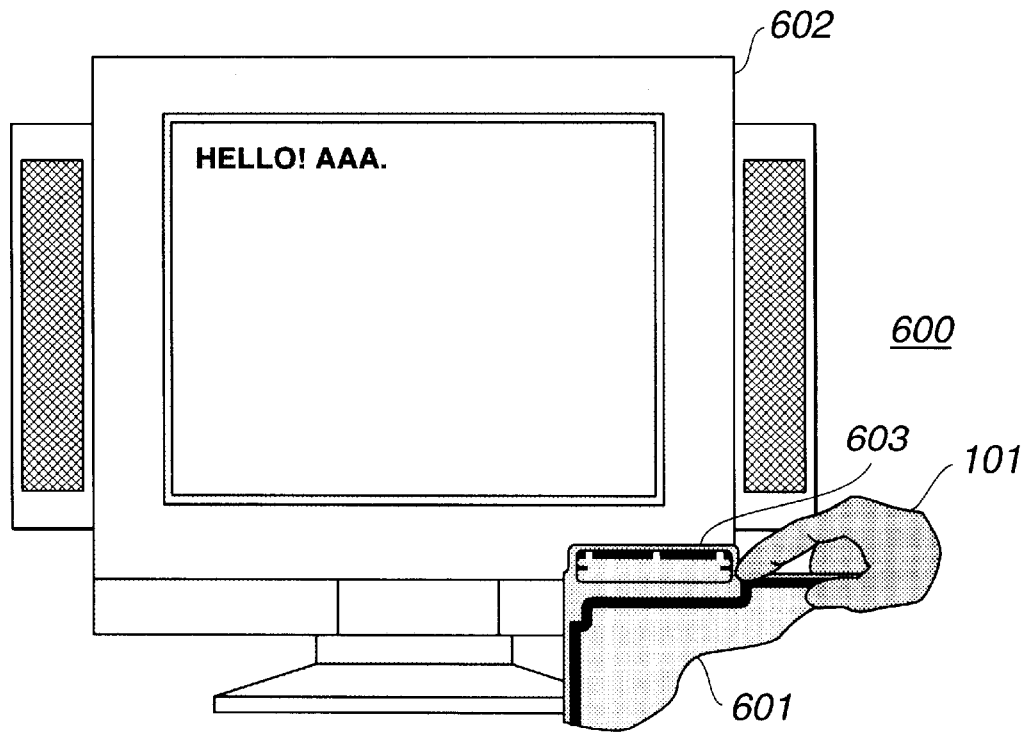
FIG. 7 is an explanatory drawing for a third embodiment of the present invention.

FIG. 7 shows a data reception apparatus 600 according to this embodiment. The data reception apparatus 600 comprises a data reception apparatus body 601 and a display 602. The data reception apparatus body 601 is configured and placed so that a user can touch it. When the user's hand 101 touches a contact point 603 on the data reception apparatus 601, a data transmission apparatus (not shown) at the user side supplies data to the data reception apparatus body 601 via the contact point 603. The display 602 outputs an appropriate message depending on whether the data reception is successful or unsuccessful. In this embodiment, the user's attribute data is transmitted. Obviously, the embodiment can be configured for conducting authentication and the like.

[Fourth Embodiment]

The following describes a fourth embodiment of the present invention. In this embodiment, a data reception apparatus is installed immovably. A user's portable data transmission apparatus receives data. Similarly, the third embodiment also installs the data reception apparatus immovably. The fourth embodiment explains a more concrete configuration. In favor of explanatory convenience, this embodiment also uses an LED for visual indications like the first embodiment. As indication means, sounds may be used like the second embodiment. Alternatively, messages may be displayed like the third embodiment.

In this embodiment, a user wears a bracelet-type data transmission apparatus. When the user touches a specified contact point on an information plate, data is transmitted to a data reception apparatus associated with the information plate. The bracelet-type data transmission apparatus is provided with a full-color LED. Indications of the full-color LED are used for notifying initiation of data transmission, transmission in process, completion of transmission, and the like. A similar full-color LED is installed on the information plate for indicating initiation of data reception, reception in process, completion of reception, and the like.

Figure 8:
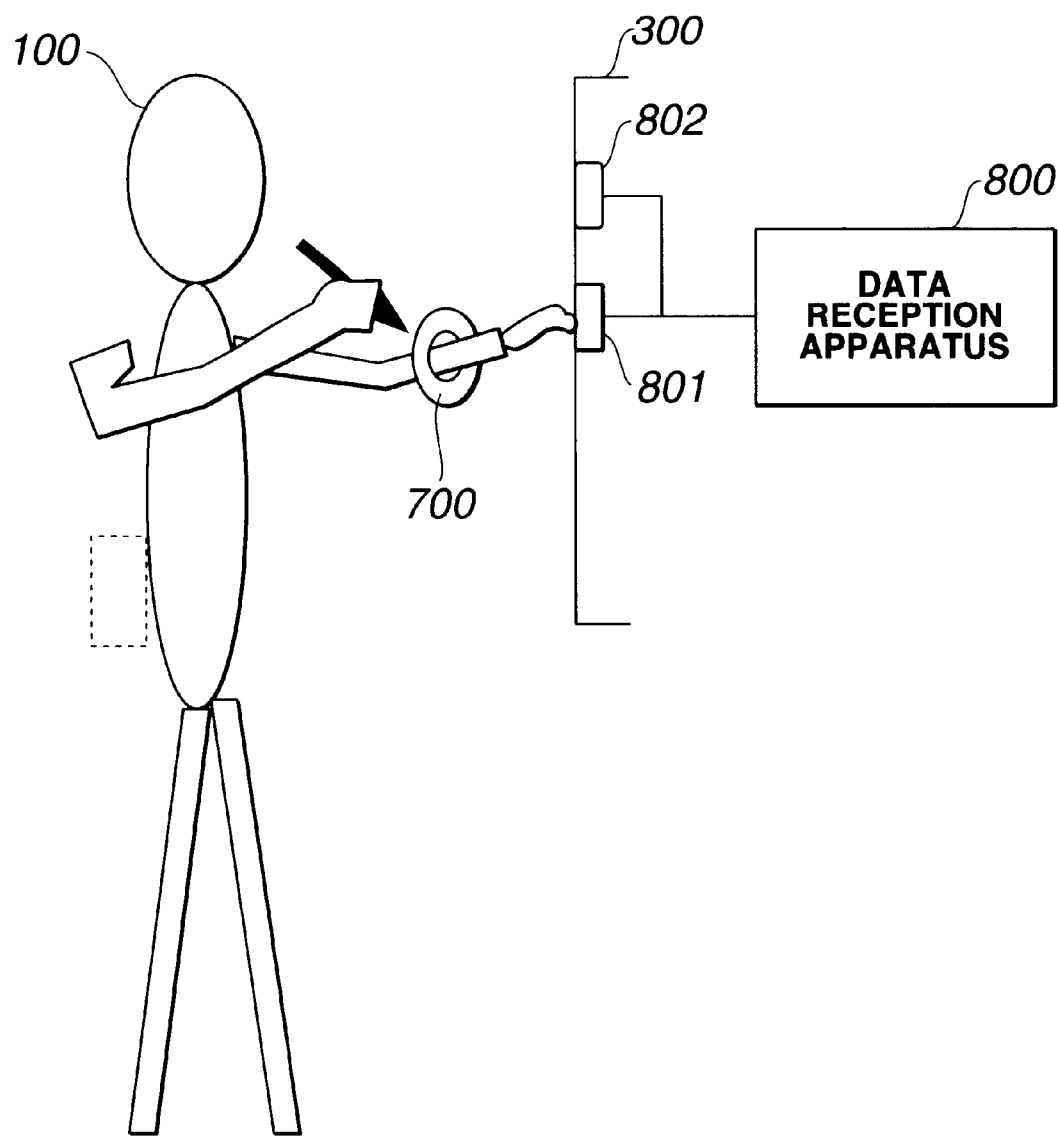
FIG. 8 is a schematic illustration showing a fourth embodiment of the present invention in its entirety.
Figure 9:
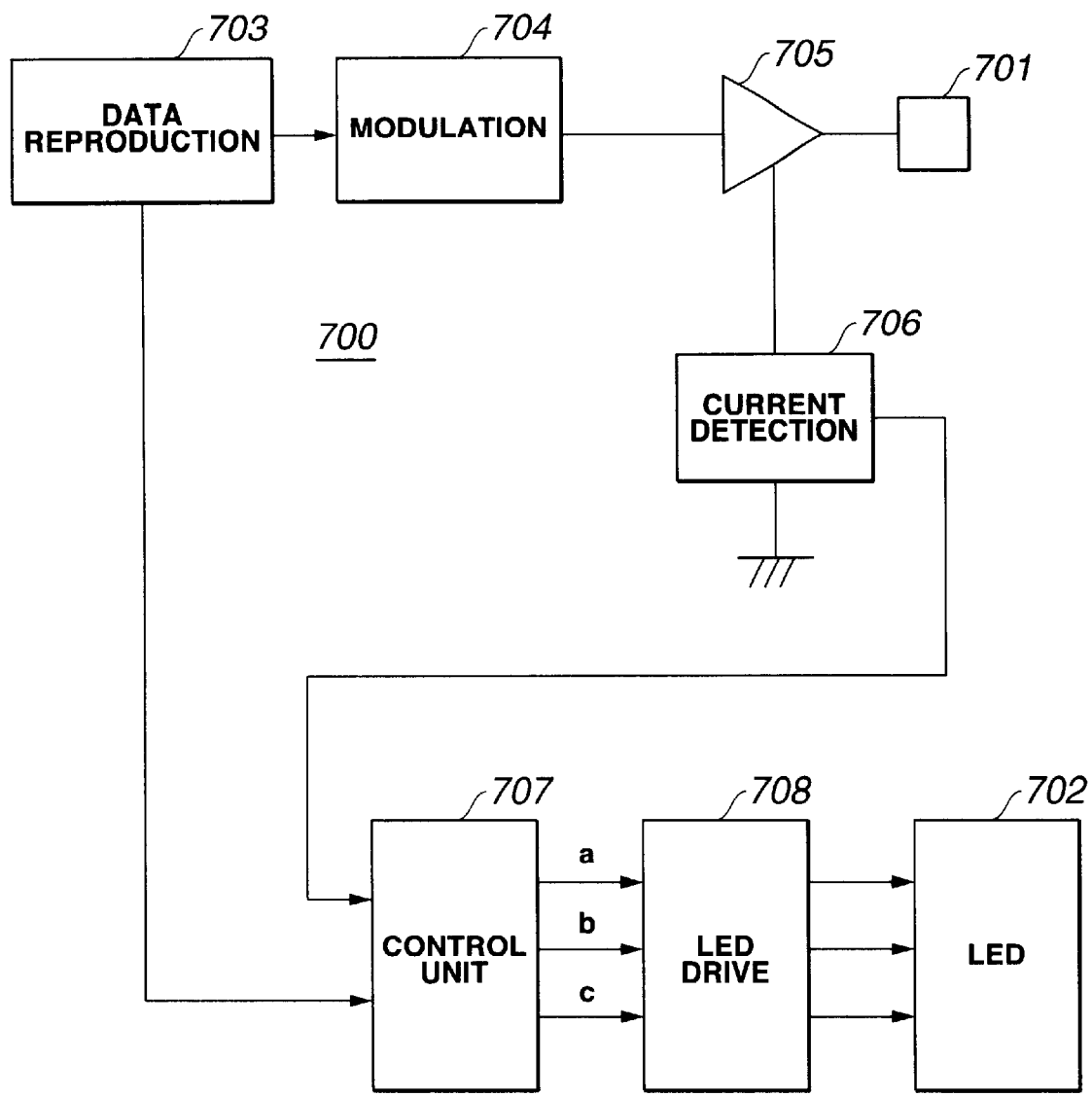
FIG. 9 is a block diagram showing a configuration example of a data transmission apparatus according to the fourth embodiment.

FIG. 8 is a schematic illustration showing this embodiment of the present invention in its entirety. In this figure, the user 100 wears a bracelet-type data transmission apparatus 700. The data transmission apparatus 700 has a contact point (electrode) 701 (FIG. 9). The contact point 701 touches the human body. The information plate 300 is installed at a height appropriate for the user 100 to touch. The information plate 300 is stationed, say, in a train, a bus, and a public institution. The information plate 300 may be used for advertisement and may be provided as display devices such as a liquid crystal display, a CRT, and a plasma display. A data reception apparatus 800 is provided in association with the information plate 300. On the information plate 300, there are provided a contact point (electrode) 801 and a full-color LED 802.

FIG. 9 shows a configuration of the data transmission apparatus 700. In this figure, the data transmission apparatus 700 comprises a conductive contact point 701, a full-color LED 702, a data reproduction unit 703, a modulation unit 704, a driver 705, a current detection unit 706, a control unit 707, and an LED drive unit 708. The data reproduction unit 703 reproduces given data or attribute information such as ID data for the user 100 or the data transmission apparatus 700 itself. Additionally, transmission data may include audio signals, video signals, text data, HTML contents and the like. Depending on cases, the transmission data may be negotiation data such as authentication data (challenge). When the data reproduction unit 703 outputs data, the modulation unit 704 modulates that data to a signal in a band for transmitting data by using the human body as a data transmission path. As mentioned above, the signal band ranges, say, from 2 MHz to 30 MHz. Available modulation methods include the FM modulation such as FSK, the AM modulation such as ASK, the code modulation, and the like. A modulation signal from the modulation unit 704 is amplified in the driver 705 and is supplied to the contact point 701. The current detection unit 706 is connected to the driver 705 and detects a current flowing from the driver 705 to the contact point 701 using, say, the current mirror technique. When the data reproduction unit 703 starts data transmission, a current detection output goes "1" accordingly. The control unit 707 generates a specified combined logical output based on a detection result from the current detection unit 706 and the end of data output from the data reproduction unit 703. The LED drive unit 708 drives R, G, and B elements of the full-color LED 702 based on the combined logical output from the control unit 707.

In this embodiment, the data reproduction unit 703 may start data transmission when the user 100 performs a specified operation such as pressing a button. Data may be transmitted repeatedly under a given condition or unconditionally at a specified interval. When the data reproduction unit 703 starts data transmission, the current detection unit 706 detects a current and supplies a signal of "1" to the control unit 707. Consequently, a first LED element drive signal "a" is supplied from the control unit 707 to the LED drive unit 708 to turn on, say, a blue LED. This LED continues to light while data is transmitted. When the data reproduction unit 703 supplies an end-of-data signal to the control unit 707, the control unit 707 outputs a second LED element drive signal "b". For example, a green LED turns on. This means successful data transmission. The greed LED turns off after a specified time period by means of a timer. When the current detection signal goes "0" from "1" with no end-of-data signal supplied to the control unit 707, the control unit 707 detects this signal change and supplies a third LED element drive signal "c" to the LED drive unit 708. This turns on, say, a red LED. This means unsuccessful data transmission. Also in this case, the LED turns off after a specified time period.

The data transmission apparatus 700 having this configuration notifies the user of data transmission states by means of the full-color LED 702's indications.

The bracelet-type data transmission apparatus 700 can be configured so that the contact point 701 thereof basically does not touch the human body. For example, as indicated with an arrow, the contact point 701 touches the human body for the first time when the user touches the data transmission apparatus 700 with the other hand. In this case, the configuration as shown in FIG. 2 is used so that the data transmission apparatus 700 starts data transmission in response to a contact between the human body an the contact point 701.

As indicated with a broken line, the data transmission apparatus may be a portable box-type storage or information terminal. Alternatively, the data transmission apparatus may be provided in the form of a necklace.

Figure 10:
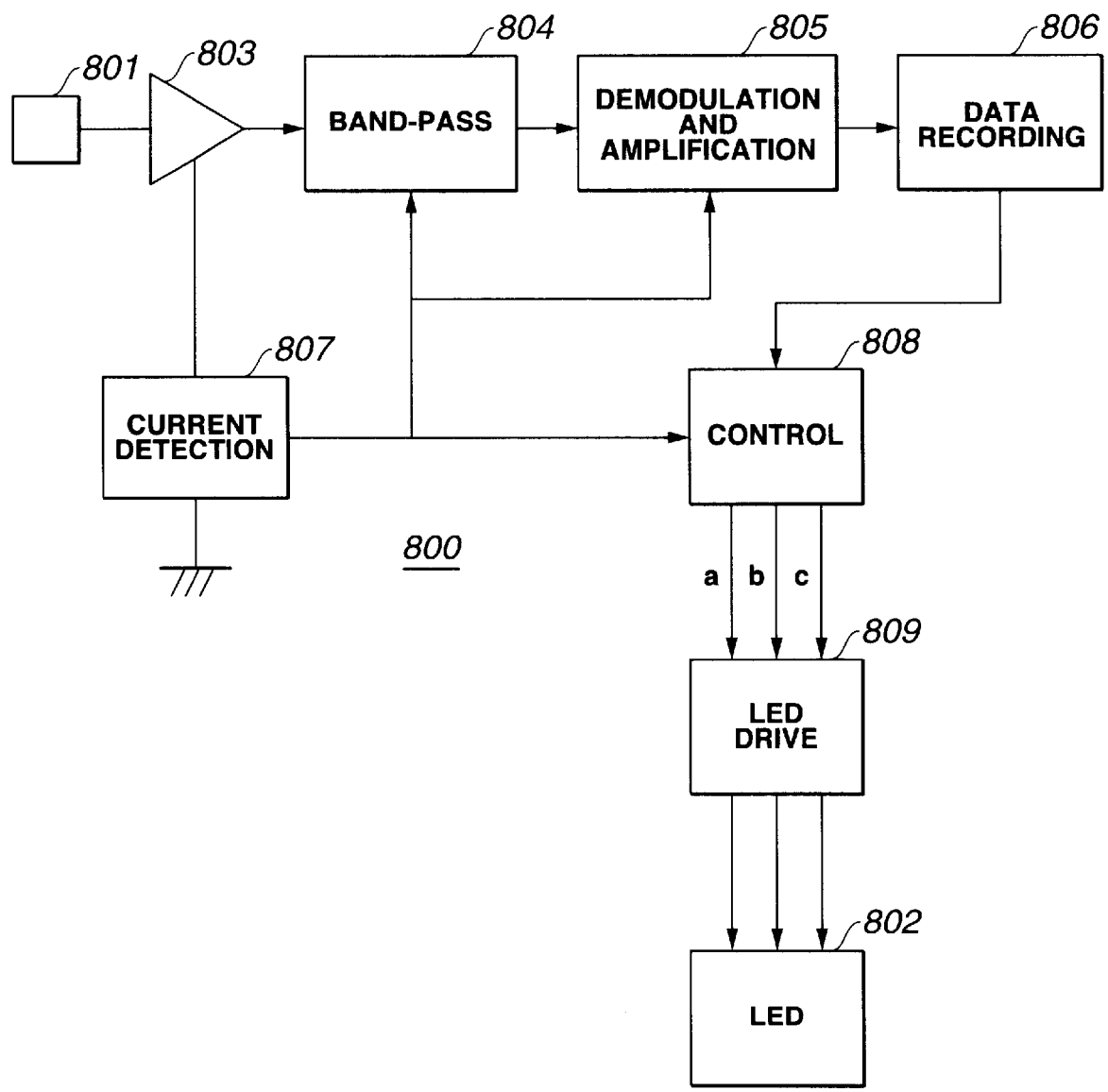
FIG. 10 is a block diagram showing a configuration example of a data reception apparatus according to the fourth embodiment.

FIG. 10 shows a configuration of the data reception apparatus 800 fixed to the information plate 300. In this figure, the data reception apparatus 800 comprises a conductive contact point 801, a full-color LED 802, a preamplifier 803, a band-pass filter 804, a demodulator and amplifier 805, a data recording unit 806, a current detection unit 807, a control unit 808, and an LED drive unit 809. The contact point 801 receives a signal transmitted via the human body when it touches the contact point 801. The preamplifier 803 amplifies the signal received via the contact point 801. The band-pass filter 804 selects signals in a modulation band. The demodulator and amplifier 805 demodulates a modulation signal passing through the band-pass filter 804, amplifies that signal, and stores it in the data recording unit 806. The data recording unit 806 may magnetically record signals or use semiconductor memory. The current detection unit 807 detects a signal in the contact point 801, namely the preamplifier 803. The control unit 808 generates a combined logical output based on a current detected in the current detection unit 807 and the end of data detected in the data recording unit 806. This combined logical output controls the LED drive unit 809.

When no modulation signal is received via the contact point 801, the current detection unit 807 outputs 0. This output signal of "0" disables the band-pass filter 804, the demodulator and amplifier 805, and the data recording unit 806. Further, the control unit 808 is supplied with a current detection signal of "0". None of the LED element drive signals "a", "b", and "c" is output, The full-color LED 209 remains off.

When a modulation signal is supplied via the contact point 801 thereafter, the current detection unit 807 generates a current detection signal of "1". This signal enables the band-pass filter 804, the demodulator and amplifier 805, and the data recording unit 806 for demodulating the modulation signal and storing data. Based on the current detection, the control unit 808 generates the first LED element drive signal "a". The LED drive unit 809 turns on the first LED element, say, a blue LED. This LED remains on while a modulation signal is received to set the current detection output to "1".

When all the data is transmitted completely and the data recording unit 806 detects the end of data, this is supplied to the control unit 808. Consequently, the control unit 808 generates the second LED element drive signal "b". The LED drive unit 809 then turns on the second LED element, say, a green LED element. This means successful termination of the data transmission. This LED turns off after a specified time period by means of a specified timer. There may be the case where the current detection unit 807's output goes "0" from "1" before the data recording unit 806 notifies detection of the end of data. In this case, the control unit 808 generates the second LED element drive signal "c". The LED drive unit 809 turns on the third LED element, say, a red LED element. This means unsuccessful data transmission. Note that this LED indication also turns off after a specified time period by means of a specified timer.

The data reception apparatus 800 having the above-mentioned configuration notifies a user of data reception states by means of LED indications.

Figure 11:
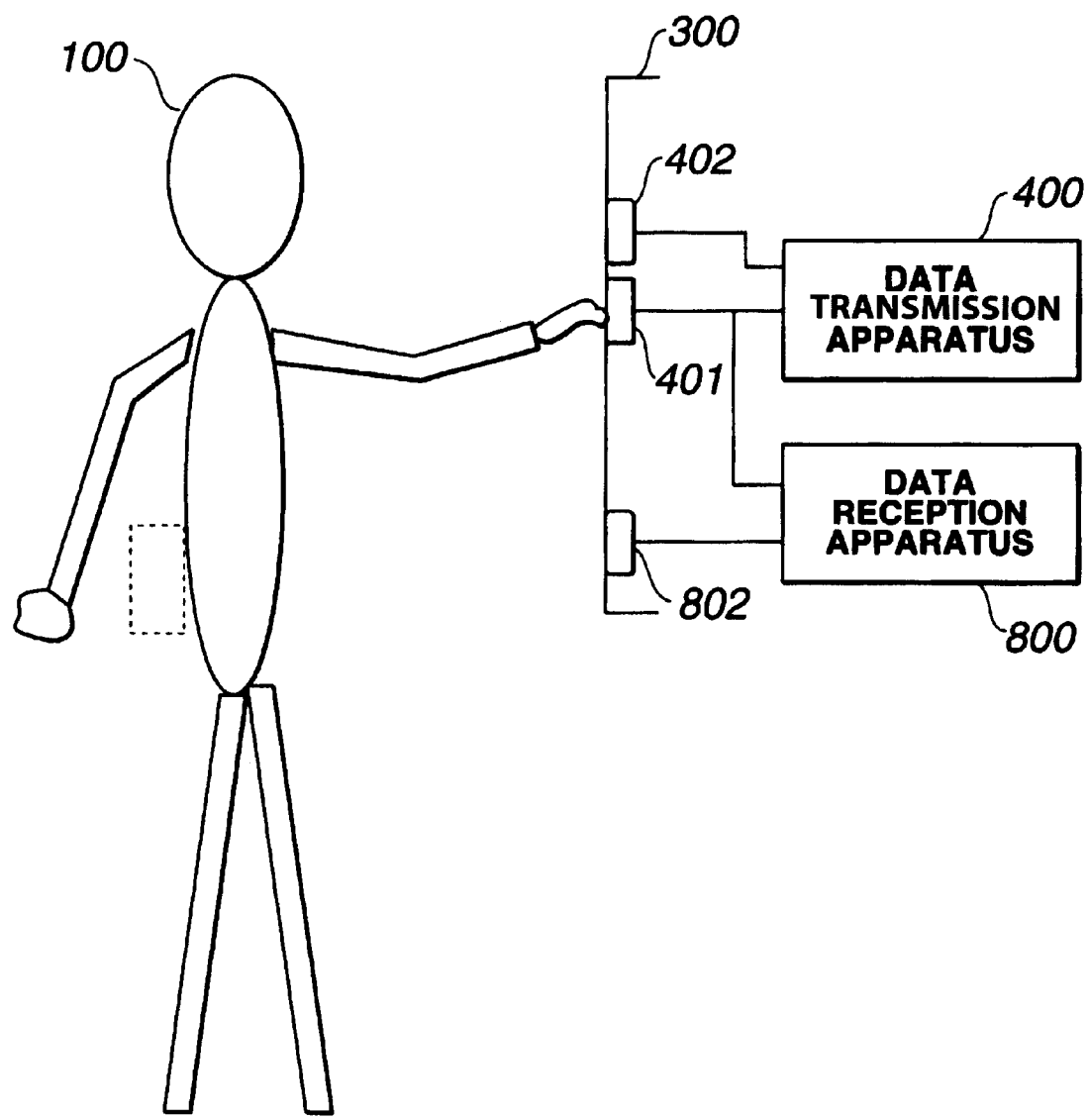
FIG. 11 is an explanatory drawing for a modification of the fourth embodiment.

In this embodiment, the information plate 300 is provided with the data reception apparatus 800. The data transmission apparatus 400 as shown in FIG. 1 may be installed as well. FIG. 11 shows this configuration. In this case, the user 100 may be provided with a bracelet-type body with a data transmission apparatus and a data reception apparatus. This configuration permits bi-directional data communications, negotiations, and the like. In this case, there may be provided two transmission channels (bands) for full-duplex communication. A single transmission channel may be provided for half-duplex communication. Of course, three or more transmission channels may be provided.

What is claimed is:

1. A data transmission apparatus appropriate to a system for transmitting and receiving signals using a human body as a transmission path, comprising:

a contact point for data transmission through contact with a human body;

means for initiating data transmission in response to contact between said contact point and said human body; and means for notifying completion of data transmission.

2. The data transmission apparatus according to claim 1, further comprising means for notifying unsuccessful data transmission.

3. A data reception apparatus appropriate to a system for transmitting and receiving signals using a human body as a transmission path, comprising:

a contact point for data reception through contact with a human body;

means for initiating data reception in response to contact between said contact point and said human body; and means for notifying completion of data reception.

4. The data reception apparatus according to claim 3, further comprising means for notifying unsuccessful data reception.

5. A data transmission/reception apparatus having a data transmission apparatus to transmit data through contact with a human body and a data reception apparatus to receive data through contact with a human body for transmitting and receiving signal through the use of a human body as a transmission path, wherein said data transmission apparatus comprising:

a contact point for data transmission through contact with a human body;

means for initiating data transmission in response to contact between said contact point and said human body; and means for notifying completion of data transmission, and wherein said data reception apparatus comprising:

a contact point for data reception through contact with a human body;

means for initiating data reception in response to contact between said contact point and said human body; and means for notifying completion of data reception.

6. The data transmission/reception apparatus according to claim 5, wherein said data transmission apparatus comprises means for notifying unsuccessful data transmission.

7. The data transmission/reception apparatus according to claim 5, wherein said data reception apparatus comprises means for notifying unsuccessful data reception.

8. A data transmission apparatus appropriate to a system for transmitting and receiving signals using a human body as a transmission path, comprising:

a contact point for data transmission through contact with a human body; and means for notifying states of data transmission using said contact point and said human body.

9. The data transmission apparatus to claim 8, wherein the notifying states include at least one initiation, continuation, completion, and unsuccessful termination of data transmission as a data transmission state.

10. A data reception apparatus appropriate to a system for transmitting and receiving signals using a human body as a transmission path, comprising:

a contact point for data reception through contact with a human body; and means for notifying states of data reception using said contact point and said human body.

11. The data reception apparatus according to claim 10, wherein the notifying states include at least one of initiation, continuation, completion, and unsuccessful termination of data reception as a data transmission state.

* * * * *